DIODE PARAMETRIC AMPLIFIER

Filed Aug. 31, 1967 2 Sheets-Sheet 1

INVENTORS
COLIN STUART AITCHISON
ROBERT DAVIES
BY
Frank R. Jifari
AGENT

DIODE PARAMETRIC AMPLIFIER

Filed Aug. 31, 1967 2 Sheets-Sheet 2

INVENTORS
COLIN STUART AITCHISON
ROBERT DAVIES
BY
Frank R. Jifoni
AGENT 3,467,907

DIODE PARAMETRIC AMPLIFIER

Colin Stuart Aitchison, Horley, and Robert Davies, Reigate, England, assignors, by mesne assignments, to U.S. Philips Corporation, New York, N.Y., a corporation of Delaware Filed Aug. 31, 1967, Ser. No. 664,801
Int. Cl. H03f 7/06
U.S. Cl. 330—4.9 7 Claims

ABSTRACT OF THE DISCLOSURE

A diode parametric amplifier in which a coaxial signal line is connected to a diode in a waveguide supporting pump oscillations by way of a filter section. The filter section has substantially zero transverse impedance at the idler frequency, so that a loop circuit is formed, including the diode and transverse impedance, that is substantially resonant at the idler frequency. The filter section is inductive at the signal frequency, so that the series combination of the diode and filter is resonant at the signal frequency.

This invention relates to a diode parametric amplifier, operable with an idler-frequency higher than the signal frequency and a pump-frequency equal to the sum of the idler and signal frequencies, of the type which comprises a waveguide tunable to resonance at a pump-frequency and having a cut-off frequency higher than the idler-frequency so as to inhibit the propagation there along of idler-frequency energy, a coaxial line having its outer conductor terminating in a conductive connection with a wall of the waveguide so that the coaxial line forms a junction with the waveguide and is operable to receive signal-frequency energy to be amplified and a voltage-dependent capacitor diode positioned within the waveguide at the junction and extending across the waveguide with one end terminal of the diode against the free end of the central conductor of the coaxial line and the other end terminal of the diode connected to a waveguide wall, and a filter section connected in series between with the diode and the inner conductor of the coaxial line.

Such arrangements are disclosed in British patent specification 996,346 but in all those arrangements the filter section is so dimensioned as to act as an isolating section at the idler-frequency so that idler-frequency energy is thus substantially confined to the vicinity of the diode: idler-frequency energy cannot, of course, propagate along the waveguide. In effect therefore the idler-frequency circuit is comprised only by the diode and the diode-holder, and this assembly forms a parallel-resonant circuit at the idler-frequency.

The present invention differs from these prior proposals in that at the idler-frequency the diode forms a series-resonant circuit: in other words the series-resonance of the diode is used to support the idler current. The reactive coaxial section no longer acts as an isolating section at the idler-frequency and the series-resonant idler-frequency circuit is completed through this section and through the effective impedance of the signal source: this effective impedance is made very low by inserting a low-pass filter between the diode and the source, this low-pass filter presenting a low-impedance shunt across the source at the idler frequency.

According to the present invention in a diode parametric amplifier of the type referred to, the filter section is so dimensioned that at the idler-frequency it presents a short-circuit across the coaxial line and forms part of a series circuit including the diode which circuit is resonant at or near the series-resonant frequency of the diode itself, together with a short-circuited coaxial section which is an integral number of half-wavelengths long at the idler-frequency connected in series with the diode, so that at the idler-frequency the said short-circuited section provides an element of zero impedance in the said series circuit, whilst at the signal-frequency it presents an inductive reactance which combines with the capacitive reactance presented by the diode to form a circuit resonant at or adjacent the signal frequency. Suitably the filter section is in the form of a coaxial low-pass filter having a cut-off frequency intermediate the signal and the idler frequencies. Suitably also, between the diode and the remainder of the coaxial line is an impedance-transforming portion which serves to transform the impedance of the remainder of the line to a lower impedance at the diode; such an impedance-transforming section may be formed, for example, by a frusto-conical portion of the central conductor of the coaxial line or by a section of the coaxial line whereof the diameter of the central conductor increases in steps.

Embodiments of the invention will now be described by way of example with reference to the accompanying diagrammatic drawings wherein.

Figure 1:
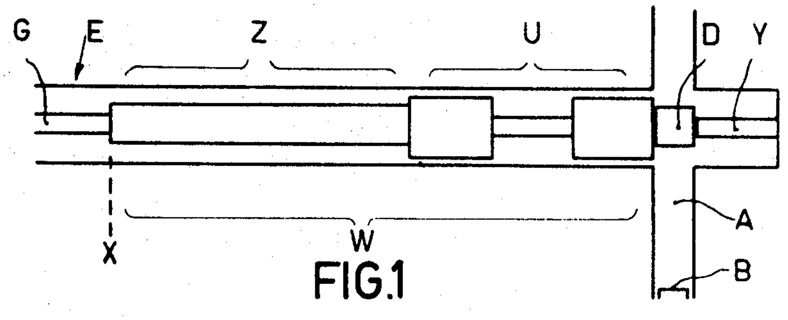
FIGURE 1 illustrates a first embodiment in part cross-section.

Referring to FIGURE 1 a diode parametric amplifier device comprises a length of waveguide A along which pump energy can be fed and a length of coaxial line E for coupling energy from a signal source to the parametric amplifier. The coaxial line forms a junction with the waveguide A, the outer conductor of the coaxial line terminating on a broad wall of the waveguide A and an end portion of the central conductor of the coaxial line extending towards the interior of the waveguide A, and abutting against one end terminal of a varactor diode D.

As will be seen from FIGURE 1 between the diode D and the coaxial line proper, that is to say the remainder of the coaxial line to the left of the plane X in FIGURE 1, there is formed an impedance transforming portion of coaxial line W which in this embodiment is formed by the outer conductor of the coaxial line and an inner conductor portion of stepped diameter, there being two such steps, Z and U, each one quarter-wavelength long in the embodiment illustrated. The inner conductor of the quarter-wavelength section U is formed to provide a low-pass filter section which at the idler-frequency forms a low-impedance reactive connection across the coaxial line but which at the signal frequency presents an impedance equivalent to a quarter-wavelength line which forms a section of the impedance-transformer W. Suitably, each of the three portions of the section U is one quarter-wavelength long at the idler frequency. This intermediate portion W thus serves as an impedance-transformer and has the effect of transforming the impedance of the coaxial line proper from an impedance of, for instance, some 50 ohms to a lower impedance which measured at the right-hand end of the portion W is appropriate to the diode quality factor.

The right-hand end terminal of the diode D, as viewed in FIGURE 1, is connected to a coaxial short-circuited section Y which is one half-wavelength long at the idler frequency and therefore at the idler frequency presents a short-circuit at the plane of the right-hand terminal of the diode. At the signal frequency however the section Y is less than a quarter-wavelength and therefore presents an inductive reactance. The diode D is so chosen that its series-resonant frequency is much higher than the signal-frequency range for which the parametric amplifier is designed; the parallel resonant frequency of the diode is, of course, higher than its series-resonant frequency.

Figure 2:
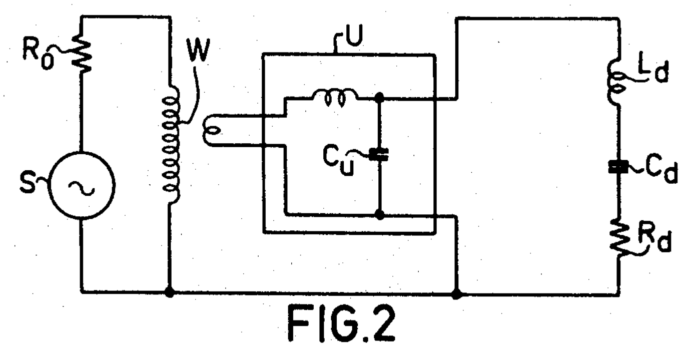
FIGURES 2, 3 and 4 are equivalent-circuit diagrams.

Referring now to FIGURE 2, this illustrates the equivalent circuit of the device. Here, a signal source S having a source impedance $R_o$ is connected through a transformer W and a filter U to a diode having a spreading resistance $R_d$, a capacitance $C_d$ and in inductance $L_d$. The circuit is completed through a short-circuited coaxial line Y which presents a short-circuit at the idler frequency and an inductance at the signal frequency. However, this equivalent circuit can be redrawn in a simpler form if only the signal frequency is considered and can also be redrawn in another simpler form when only the idler frequency is considered.

Figure 3:
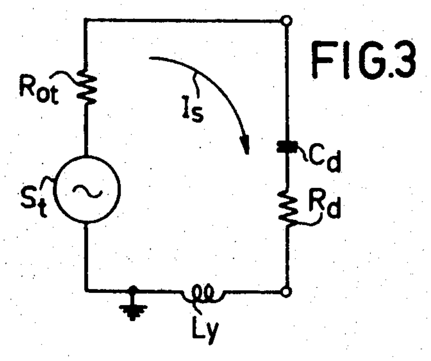

Referring now to FIGURE 3, this illustrates the equivalent circuit at the signal frequency where $L_u$ represents the inductance presented at the signal frequency by the filter section U. The "transformed" source $S_t$ has a transformed internal impedance $R_{ot}$ which represents the impedance at a point adjacent the right-hand end of the filter section U. This source is connected to the diode which is here represented by the series arrangement of resistor $R_d$ representing the spreading resistance of the diode and a capacitor $C_d$ representing the capacitive reactance presented by the diode at the signal frequency: the circuit is completed through inductor $L_y$ representing the inductance of the section Y, and the reactive elements $L_u$, $C_d$ and $L_y$ are selected to form a series-resonant loop at the signal frequency.

Figure 4:
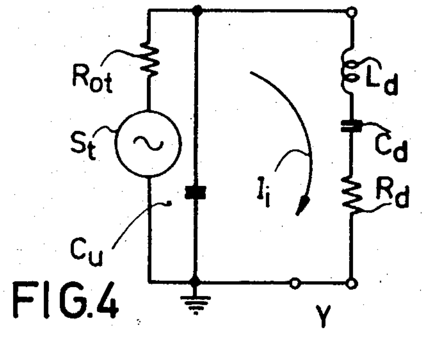

The idler frequency is substantially the same as the series-resonant frequency of the diode and the diode circuit in its series-resonant condition support the idler-frequency current; at the idler frequency the conditions may be represented by the equivalent-circuit diagram of FIGURE 4. In this figure the diode forms part of a series-resonant circuit of which the frequency is determined, in the main, by the diode inductance $L_d$ and diode capacitance $C_d$; the filter section U now presents a very small reactance $C_u$ which completes the series-resonant loop and by-passes the surce S, whilst the section Y effectively connects one terminal of the diode to the "grounded" side of the source.

The currents circulating at the respective frequencies are indicated by $I_s$ and $I_i$ on FIGURES 3 and 4 respectively.

In operation, pump energy is supplied to the free end, not shown, of the waveguide A by any convenient means, the waveguide system being tuned to the frequency of the pump by means of the piston B. Thus the whole system comprising the waveguide and the diode is included in the equivalent tuned circuit at the pump frequency so that it forms a tuned circuit having both lumped and distributed constants. The waveguide A has, of course, a cut-off frequency which is above the signal and the idler frequencies so that energy at those frequencies cannot propagate along the waveguide.

Figure 5:
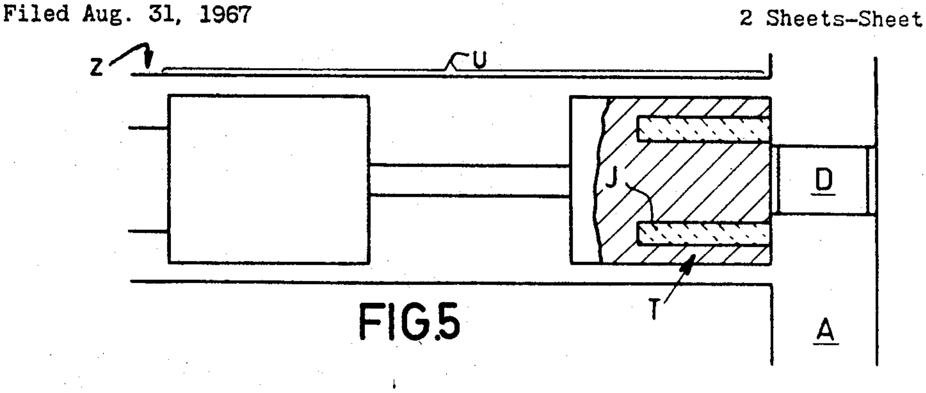
FIGURE 5 illustrates a second embodiment.

In the embodiment illustrated in FIGURE 5 the section Z, of which only a small portion iss hown, is the same as in the embodiment illustrated in FIGURE 1; the filter section U, which is shown partly in cross-section, is also the same except that the large-diameter part adjacent the diode D is formed with an internal idler-frequency half-wave short-circuit choke section T. Again, the portions Z and U form an impedance-transformer between the varactor diode D and the remainder of the coaxial line. The diode D is positioned with one end terminal against and in conduction with a wall of waveguides; the other end terminal of the diode is against the free end of the inner portion of the central conductor of the coaxial line, this portion forming part of the coaxial section T which is so dimensioned that it forms a short-circuited half-wave coaxial line at the idler frequency and at the same time acts as an inductor at the signal frequency. Now, since it is required to accommodate an idler-frequency half-wave coaxial choke section wtihin a portion of central conductor which is more or less a quarter-wavelength long at the frequency, it is necessary to fill this section with a dielectric material J so as to increase its electrical length: obviously, the dielectric constant of the material J would have to be not less than 4 since the velocity of propagation in the choke section will need to be at most one half of the velocity of propagation along the coaxial line.

Figure 6:
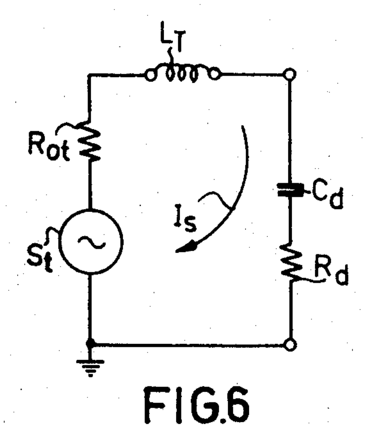
FIGURES 6 and 7 are equivalent-circuit diagrams pertaining to the second embodiment.

At the signal frequency the equivalent circuit can be represented as illustrated in FIGURE 6; with the exception that inductor $L_y$ is replaced by an inductor $L_T$ representing his inductance of the section T, FIGURE 6 is the same as FIGURE 3 and it can be seen that the diode capacitance is tuned by the inductance of section T to form at the signal frequency a series-resonant loop which includes the source S.

Figure 7:
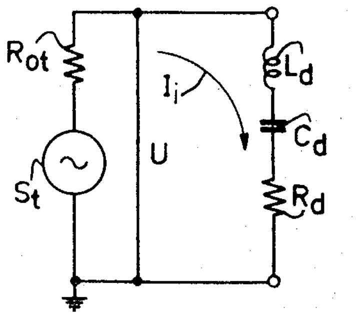

FIGURE 7, which can be compared with FIGURE 4, illustrates the situation at the idler frequency; the section U gain presents a very small reactance represented by $C_u$ and completes a series loop which is resonant at substantially the series-resonant frequency of the diode itself.

Figure 8:
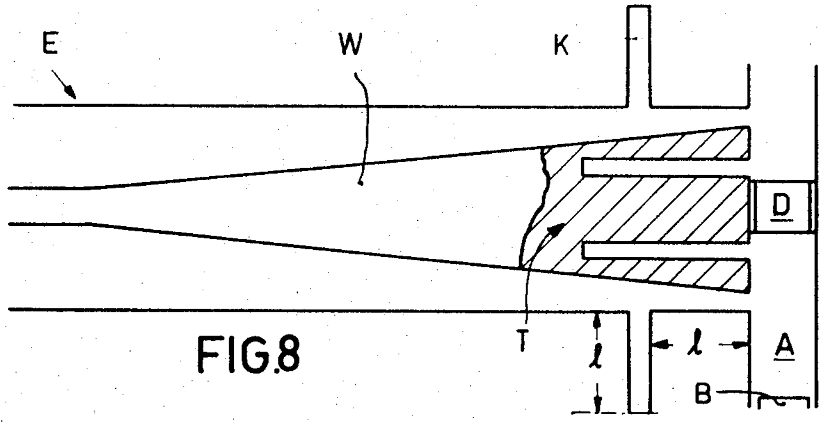
FIGURE 8 illustrates a third embodiment.

In the embodiment illustrated in FIGURE 8 a coaxial line E is formed with an impedance-transforming taper W and at the end adjacent the diode D the central conductor of the coaxial line is formed with a short-circuit choke section T, one half-wavelength long at the idler frequency, in substantially the same manner as in the embodiment illustrated in FIGURE 5. The permissible physical length of the coaxial choke section T will depend upon the angle of taper of the portion W and it may be practicable to make this choke section sufficiently long to obviate the need for a dielectric filling J such as is illustrated in FIGURE 5. A radial choke K, one quarter-wavelength $l$ long at the idler frequency, is spaced along the coaxial line one quarter-wavelength $l$ from the junction so as to present in operation a short-circuited half-wavelength coaxial section, at the idler frequency, in the plane where the right-hand end of the line contacts the left-hand end of the diode D. At the signal frequency however this radial choke K presents an inductance in series with the coaxial line, in a similar manner as does the section Y described with reference to FIGURES 1 to 4, so as to assist the inductance presented by the coaxial choke T in forming a series-resonant loop.

The embodiments illustrated have been found to be appropriate for signal frequencies of up to X-band; typical idler frequencies would be some 15 to 30 gc./s., the pump frequency being equal to the sum of the signal and idler frequencies. Although the particular embodiments illustrated contain some features, such for instance as the differently-formed impedance-transforming sections and the coaxial section Y, which are each found in only one or two of the embodiments, it will be understood that none of these features is of itself an essential part of any particular construction: thus for instance the section Y of FIGURE 1 could be incorporated into the construction of FIGURE 8, replacing the radial choke K. Again, only two forms of filter/choke section, U and K, have been illustrated but these may be modified or replaced by any other suitable arrangement having the same effects at the idler and signal frequencies as those described.

What is claimed is:

1. In a diode parametric amplifier of the type having a waveguide section for supporting pump oscillations, a voltage dependent capacitor diode within said waveguide section, means connecting one electrode of said diode to a wall of said waveguide section, and a coaxial signal line having an outer conductor connected conductively to the wall of said waveguide section and an inner conductor connected to the other electrode of said diode; the improvement wherein the portion of said line adjacent said waveguide section comprises a filter section forming a short-circuited section an integral number of half-wavelengths long at the idler frequency, said short circuit section having a substantially zero transverse impedance across said line at said idler frequency, whereby the loop circuit consisting of said diode, transverse impedance, and means connecting the one electrode of said diode to said wall is substantially in series resonance at said idler frequency, said filter having an inductive series reactance at the signal frequency whereby the series circuit of said filter, diode, and means connecting said one electrode of said diode to said wall is substantially at series resonance at said signal frequency.

2. The amplifier of claim 1 wherein said filter is a coaxial low-pass filter having a cut-off frequency intermediate the signal and the idler frequencies.

3. The amplifier of claim 2 wherein said filter section comprises an impedance-transforming portion which serves to transform the impedance of the remainder of the line to a lower impedance at the diode.

4. The amplifier as claimed in claim 3 wherein the impedance transforming portion is a frusto-conical portion of the central conductor of the coaxial line.

5. The amplifier as claimed in claim 3 wherein the impedance-transforming portion is formed by a section of the coaxial line in which the diameter of the central conductor increases in steps.

6. The amplifier as claimed in claim 3 wherein the said one electrode of the diode is directly against and in conduction with a wall of the waveguide, and wherein the said short-circuited section is formed by a coaxial choke formed in the end of the central conductor, with the free end of the inner portion of the central conductor.

7. The amplifier as claimed in claim 3 wherein the said short-circuited coaxial section is connected between the said one electrode of the diode and a wall of the waveguide.

References Cited

UNITED STATES PATENTS 3,195,063 7/1965 Collard et al. -------- 330—4.9

FOREIGN PATENTS 996,346 6/1965 Great Britain.

ROY LAKE, Primary Examiner

D. R. HOSTETTER, Assistant Examiner

U.S. Cl. X.R.

330—56